Oct. 25, 1932.    H. J. ZIEMANN    1,884,491
PLASTERER'S HAWK
Original Filed Oct. 12, 1929
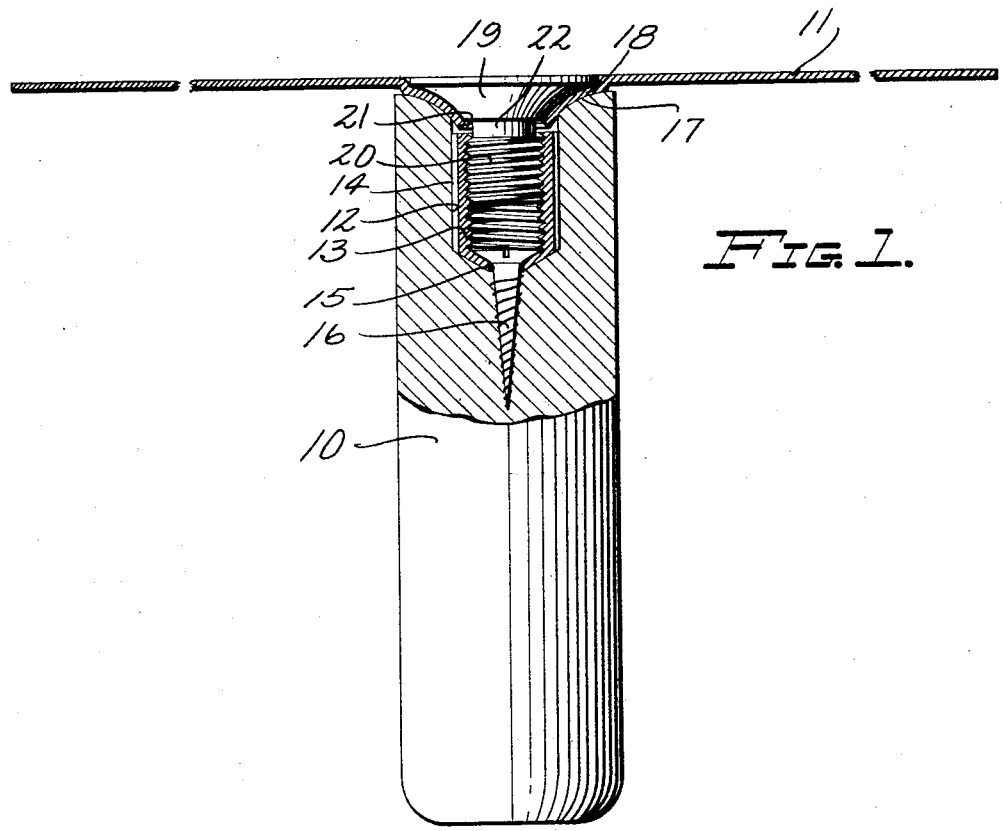
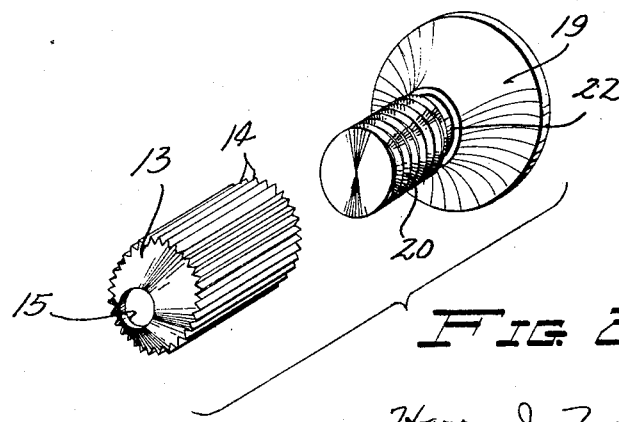

Patented Oct. 25, 1932

1,884,491

UNITED STATES PATENT OFFICE

HARRY J. ZIEMANN, OF MILWAUKEE, WISCONSIN, ASSIGNOR TO EMPIRE LEVEL MANUFACTURING COMPANY, OF MILWAUKEE, WISCONSIN, A CORPORATION OF WISCONSIN

PLASTERER'S HAWK

Application filed October 12, 1929, Serial No. 399,149. Renewed June 20, 1932.

My invention relates to improvements in a plasterer's hawk.

The object of my invention is to provide an improved connection between the handle and the plate of a plasterer's hawk, whereby not only to provide a secure means for making such connection but also to obviate the necessity for boring a hole completely through the longitudinal axis of the handle. Another object of my invention is to provide a fitting to be embedded in the handle of a plasterer's hawk adjacent the plate of the hawk whereby to provide an enlarged threaded connection of such strength that aluminum and other comparatively soft metals or materials may be used.

A further object of my invention is to provide a metallic or other durable fitting for a comparatively soft handle material whereby to provide a strong and easily assembled connection between such handle material and the device to which it is to be secured.

In the drawing:

Figure 1 is a side elevation of a plasterer's hawk with the plate and a portion of the handle structure in section to exhibit my invention.

Figure 2 is an expanded view of the plate fitting or bolt and the socket fitting or nut used in my improved construction.

Like parts are identified by the same reference characters throughout the several views.

Heretofore it has been customary in most constructions of plasterers' hawks to bore a hole completely through the longitudinal axis of a handle 10 of a plasterer's hawk and provide a fitting countersunk or otherwise disposed in the plate 11 comprising the working surface of the plasterer's hawk so that a bolt disposed in the hole bored through the handle would be receivable in a threaded bore through the fitting so that the handle might be securely positioned against the underside of the plate. The boring of the hole longitudinally through the handle, however, has been an expensive process and because of the limited dimensions of a handle the fittings have been comparatively small and necessarily of brass or other harder material if the product was to be durable and the bolt provided with a sufficiently secure threaded connection with the plate fitting.

In my construction I have obviated the necessity for boring the hole completely through the handle and have in place thereof provided for a socket 12 in which a socket fitting or nut 13 provided with serrated edges or knurled surface, as indicated at 14 in Figure 2, is pressed. The inner extremity of the nut 12 is slightly tapered and is apertured at 15 to receive an ordinary wood screw 16 which is drilled into the body of the handle to securely seat the nut 13 in the socket 12.

The end of the handle adjacent the plate 11 of my plasterer's hawk is shaped as indicated at 17 to conform to a stamped or pressed out portion 18 of the plate 11, the countersunk portion of the plate thus provided being shaped to receive a plate fitting or bolt 19, the top face of which is thus disposed in the plane of the top of the plate of the hawk.

The countersunk portion 11 of the plate as shown in cross section in Figure 1 is in the form of an ogee or double curve which avoids sharp creases in the material of the plate and prevents cracking of the plate around the handle when the plate is repeatedly flexed under heavy loads.

If the countersunk portion is merely countersunk on a straight line so as to provide a crease at the margin of the countersunk portion in the plane of the plate, the drawing operation used to form the countersunk portion will cause the metal at the margin thereof to be thinned down to such an extent that the metal at that point will soon be fatigued and will crack, whereas in my construction the double curve provides several points where the metal is thinned in the drawing operation with a result that no point in the ogee curve is thin enough to be substantially weakened.

When the plate fitting 19 is seated in the countersunk portion 18 of the plate the threaded bolt portion 20 of the plate fitting extends through an aperture 21 so as to be exposed beneath the plate for interaction with the nut 13 which may be threaded thereon merely by rotation of the handle 10 since the nut is secured against rotation in the socket 12 by the serrated or knurled portion 14 of the nut.

It will be noted that an annular channel is provided in the plate fitting at 22. The margins of the aperture 21 in the depressed portion of the plate 11 are of such a diameter that the threads upon the portion 20 of the plate fitting will contact sufficiently therewith to require that the plate fitting be turned through the opening in a threading manner and when the plate fitting has been threaded through the aperture 21 the annular channel 22 will provide for free rotation of the fitting in the plate and thus free the fitting for threaded engagement with the nut 13.

In manufacturing and assembling my plasterer's hawk it will be found that the socket 12 for the nut 13 is sufficiently shallow to be easily formed and the nut 12 may be easily placed home to a firm seat in the socket where it may be secured by means of the screw 16. Then a mere turning motion of the handle 10 which, therefore, turns the nut 13 about the threads of the plate fitting 19 will secure the handle permanently and firmly against the lower surface of the portion 18 of the plate 11.

It will be noted that because of the fact that the nut 13 is internally threaded a very large diameter is offered for the receipt of the threaded portion 20 of the plate fitting 19. The strength of the parts thus provided is greatly enlarged and I have found that aluminum as well as other light and comparatively soft materials may be safely used with a resulting strength of assembly more than comparable to the strength of the parts heretofore used when a bolt extending completely through the handle was provided for engagement with the threaded bore of a plate fitting.

It will likewise be noted that because of the fact that I have provided threaded engagement of the plate fitting with the margins 21 of the aperture in the plate an easier assembly and shipping of the parts is provided since the plate fitting 19 will not accidentally be dropped from the aperture and be lost.

I claim:

1. In a plasterer's hawk, the combination with an apertured plate of a handle having a socket in one end thereof, a nut anchored in said socket, a bolt having a head seated in a depression in said plate adjacent said aperture and having a threaded shank engaging the threads of said nut in said handle, whereby said plate and said handle are operatively secured together.

2. In a plasterer's hawk the combination with a handle provided with a socket, an internally threaded nut receivable in the socket, said nut being provided with an aperture adjacent the base of the socket, a screw receivable through the aperture in the nut for extension into the handle to secure the nut in the socket and a plate provided with a depression adapted to receive means for a threaded engagement with the nut whereby said plate is secured to said handle.

3. A plasterer's hawk comprising in combination, a handle having a socket; an internally threaded nut disposed in said socket having a splined connection therewith to prevent rotation therein, said nut having a reduced aperture at one end and a screw extending through said aperture and being threaded in said handle to prevent axial displacement of said nut from said handle; a plate having an aperture adjacent said handle; and a bolt having a head cooperating with said plate adjacent said aperture and having a threaded shank engaging the threads of said internally threaded nut for securing said plate to said handle.

HARRY J. ZIEMANN.